(No Model.)

J. L. HATCH.
REPAIR PLUG FOR FLEXIBLE TUBING.

No. 583,436. Patented May 25, 1897.

Witnesses:
A. C. Harmon
Thomas J. Drummond

Inventor:
James L. Hatch.
by Crosby Gregory
Attys.

UNITED STATES PATENT OFFICE.

JAMES L. HATCH, OF MILFORD, MASSACHUSETTS, ASSIGNOR, BY MESNE ASSIGNMENTS, TO CHARLES H. PHINNEY, OF BROOKLINE, MASSACHUSETTS.

REPAIR-PLUG FOR FLEXIBLE TUBING.

SPECIFICATION forming part of Letters Patent No. 583,436, dated May 25, 1897.

Application filed October 22, 1896. Serial No. 609,644. (No model.)

*To all whom it may concern:*

Be it known that I, JAMES L. HATCH, of Milford, county of Worcester, State of Massachusetts, have invented an Improvement in Repair-Plugs for Flexible Tubing, of which the following description, in connection with the accompanying drawings, is a specification, like letters on the drawings representing like parts.

This invention has for its object the production of a novel and efficient repair-plug for closing up holes or punctures in flexible tubing—such as hose, pneumatic-tire tubes, &c. Repair-plugs of rubber are used in large quantities for repairing punctures in pneumatic-tire tubes for bicycles and other vehicles, such plugs consisting of a shank and a smooth, flexible, disk-like head. To repair a puncture, the head is smeared with suitable cement and forced into the hole, expanding when in the tube to its normal size, and the shank is then pulled outwardly to press the head tightly against the inner surface of the tube until the cement hardens. The projecting end of the shank is then cut off flush with the outer surface of the tube and the puncture is closed. In practice it has been found that the cement readily squeezes out from between the head of the plug and the tube, so that an insufficient quantity remains to properly cement the parts together, and the shanks, from the difficulty of retaining a firm hold thereon, frequently slip bodily into the tube. By my invention I have overcome these objections without materially increasing the cost of the plug, and thereby I am enabled to attain a firm and lasting closure for the puncture. To this end I provide the head of the plug with a suitable corrugation or depression to retain the cement applied thereto. I have also shown the shank of the plug as provided with one or more annular ribs, fins, or corrugations, one of which, due to the expansion of the shank after having been pulled out through the tube, rests against the outer surface of the said tube or embeds itself in the walls of the hole or puncture, said ribs also acting to retain the cement between them, and at the same time they provide a firm hold for the piece of string or wire attached to the shank when the plug is inserted, such string or wire serving as a means for drawing the shank outwardly from the hole in the tube to seat the head at the inner side thereof.

Figure 1:
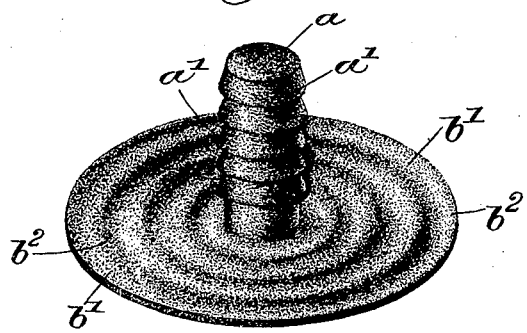
Figure 2:
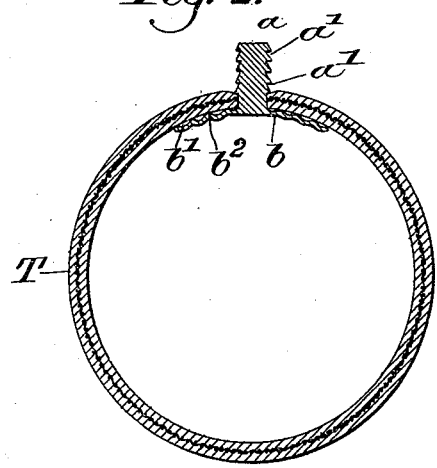

Figure 1 is a greatly-enlarged perspective view of a repair-plug embodying one form of my invention. Fig. 2 is a cross-sectional view of a tube with a plug inserted to close a hole or puncture, and Fig. 3 is an enlarged sectional view of another form of plug embodying my invention.

I preferably make the plug of molded rubber, it comprising a cylindrical shank $a$ and a thin flexible head $b$, Figs. 1 and 2, the shank being preferably provided with annular ribs or enlargements $a'$ at a distance from the head preferably equal to the thickness of the thinnest tube T to be repaired.

Figure 3:
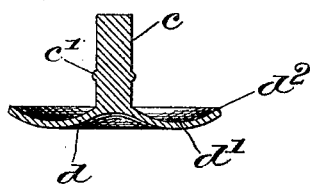

When the plug is in place, as shown in Fig. 2, the nearest enlargement $a'$ rests against the outer surface of the tube and assists in keeping the plug in place, it being understood that the projecting end of the shank is cut off adjacent the enlargement, the ribs being shown in Fig. 1 as frusto-conical in shape and in Fig. 3 as rounded.

In Figs. 1 and 2 I have shown the head $b$ as corrugated to form a series of concentric depressions $b'$ within its periphery, said depressions holding the cement in comparatively large quantity.

When the head is drawn up against the inner surface of the tube, the raised portions $b^2$ between or separating the depressions and the latter tend to gradually flatten out, on account of the thin flexible walls with their even parallel sides, due to the crimping or corrugations of the rubber, and the cement is spread in a substantially even and thick layer over the surface of the head, the cement also serving, as it dries, to draw down or flatten out against the inside of the tube the walls at $b'$, which are more or less raised while holding the moist cement. The depressions and ridges prevent the cement from being squeezed out into a too thin and inefficient film between the head of the plug and the adjacent surface of the tube, so that the cement is retained very perfectly in place, and at the same time the thin and even character of the corrugations, the opposite surfaces of the head being parallel, permits the head $b$ to flatten down readily as the cement sets, the result being that a perfect and intimate union takes place between the meeting surfaces of the tube and head $b$. As a matter of course the surplus cement will be squeezed out, but the greater portion will be retained for use. Instead of providing the head with alternating ridges and depressions, as described, I may make the head with a cupped or concave surface on the face next the shank, as in Fig. 3, and the shank with a single rib $c'$, the thickness of the head, however, retaining its thin even character, having parallel surfaces, the same as in the more corrugated form above described, and the depression $d'$ being upwardly curved at each side, viewing Fig. 3.

The head $d$ is molded to form an annular cavity or depression $d'$ between the shank $c$ and the edge or periphery $d^2$, the edges or sides of the cavity sloping toward each other from the shank $c$ and from the periphery $d^2$ to form the depression entirely below them, the concave surface holding the cement.

When the plug is applied to the tube and the head is gathered around its shank prior to being forced through the puncture, the cement is held in the depression $d'$ or the plurality of depressions $b'$, which bow or belly out away from the shank around which they are gathered, and when the head subsequently recovers its extended position within the tube the cement is retained from undue escape by the periphery $d^2$ and the raised portions $b^2$, as the head flattens by the outward pull on the shank $c$.

In applying the plug a string or wire can be secured to the shank below its annular enlargement, the latter affording a firm hold and preventing the string or wire from slipping off when pull is exerted to seat the head against the tube.

By making the ribs frusto-conical, as shown in Figs. 1 and 2, with their bases toward the head of the plug, the outward movement of the shank is facilitated, and when the head is snugly up against the tire-tube the nearest rib to the exterior of the tube springs out over it and holds the plug from slipping in, for it will be understood that as the plug is drawn outwardly to seat the head the shank is stretched and decreased in diameter, and when released from pressure it expands laterally, letting the rib next to the outer side of the tube expand and close the hole in the tube. The spaces between the ribs of the shank also serve to hold cement, thus causing complete air-tight closure between the shank and the mouth of the hole in the tube.

I have herein shown the shank of the plug as corrugated, but broadly said corrugations, irrespective of the head of the plug, are not herein claimed, as the same have been made the subject-matter of an application, Serial No. 622,463, filed by me on the 8th day of February, 1897, and claimed therein.

Having fully described my invention, what I claim, and desire to secure by Letters Patent, is—

1. A repair-plug for flexible tubing, comprising a flexible head and a shank having a series of engaging corrugations thereon, substantially as described.

2. A repair-plug for flexible tubing, comprising a flexible head and a shank having a series of frusto-conical ribs $a'$ thereon, their bases being nearer the head, substantially as described.

In testimony whereof I have signed my name to this specification in the presence of two subscribing witnesses.

JAMES L. HATCH.

Witnesses:
 GEO. W. GREGORY,
 JOHN C. EDWARDS.